United States Patent

Lichtman

[15] 3,706,621
[45] Dec. 19, 1972

[54] VACUUM PROCESS FOR APPLICATION OF SHEET COATINGS

[72] Inventor: Joseph Z. Lichtman, Brooklyn, N.Y.

[73] Assignee: The United States of America as represented by the Secretary of the Navy

[22] Filed: Jan. 7, 1970

[21] Appl. No.: 1,085

[52] U.S. Cl. ..................156/285, 156/71, 156/322
[51] Int. Cl. .............................................B29c 17/00
[58] Field of Search..................156/71, 285, 321, 322

[56] References Cited

UNITED STATES PATENTS

| | | | |
|---|---|---|---|
| 2,728,703 | 12/1955 | Kiernan et al. | 156/321 UX |
| 3,264,157 | 8/1966 | Lattimer | 156/285 X |
| 3,026,232 | 3/1962 | Finch | 156/285 X |
| 3,130,101 | 4/1964 | Gittins et al. | 156/285 X |
| 3,514,308 | 5/1970 | Scott, Jr. et al. | 156/322 X |
| 2,709,147 | 5/1955 | Ziegler | 156/285 X |
| 3,360,425 | 12/1967 | Boone | 156/330 X |

Primary Examiner—Reuben Epstein
Attorney—Richard S. Sciascia, Louis B. Applebaum and Philip Schneider

[57] ABSTRACT

A process for applying erosion resistant coverings to surfaces of structures exposed to cavitation comprising the following steps:

1. Pretreating a surface of the covering material which is in the form of a thin sheet, to improve its adhering properties;

2. Pretreating the surface of the material to be protected (substrate) to improve its adhering properties;

3. Heating the surface of the substrate;

4. Coating said cleaned surfaces with an adhesive of the epoxy-resin-type;

5. Applying the coated surface of the covering to the coated surface of the substrate;

6. Maintaining, preferably by evacuation, close contact between the covering, adhesive and substrate while the adhesive cures.

5 Claims, 1 Drawing Figure

PATENTED DEC 19 1972 3,706,621
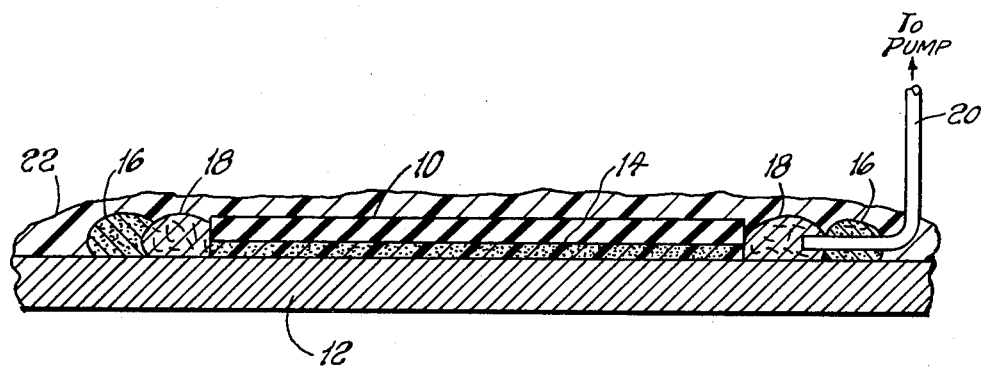
INVENTOR.
JOSEPH Z. LICHTMAN
BY Philip Schneider
ATTORNEYS

VACUUM PROCESS FOR APPLICATION OF SHEET COATINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to resistant coverings and especially to such coverings for the protection of surfaces exposed to erosion by cavitation due to the flow of fluids.

The higher speeds of modern marine vessels has resulted in a much higher rate of erosion of metal surfaces which are exposed to cavitating flows. Attempts have been made to protect the underwater surfaces of vessels by covering or coating them with various types of materials.

These attempts have met with difficulties. For example, solvent-type coatings require many coats to provide thicknesses (approximately 30 mils) sufficient to resist erosion. Cured-sheet coverings using solvent-type adhesives for bonding permit solvent entrapment and decrease in adhesive strength. Application time is also longer because longer time is required for curing the solvent-type adhesive. Cured-in-place coverings require elaborate jigs and are relatively more expensive than the process described herein.

SUMMARY OF THE INVENTION

An object of this invention is to protect surfaces against erosion by cavitating flows.

A further object is to provide an improved process for bonding sheet material to a substrate, said process having advantages in application time, adhesive strength, ease of application and economy over present processes.

These and other advantages are accomplished by a process which calls for pretreatment of the contacting surfaces of the covering material and substrate, coating the pretreated surfaces with epoxy-resin-type adhesive, applying the coated covering to the coated substrate, and maintaining close contact between the covering and substrate while the adhesive coating cures.

BRIEF DESCRIPTION OF THE DRAWING

Other objects, advantages and novel features of the invention will become apparent from the following detailed description of the invention when considered in conjunction with the accompanying drawing wherein:

The single FIGURE illustrates one method of applying a covering to a substrate according to the teachings of the invention.

DESCRIPTION OF THE PREFERRED EMBODIMENT

In the FIGURE, a covering sheet 10 is laid upon a substrate 12, with a layer of adhesive material 14 between them.

The covering sheet 10 may be made from various types of materials (nylon, vinyls, metals, etc.) depending on the intended use. For protection of the metal surfaces of vessels against cavitating flows, a cured elastomeric material such as sheet rubber, neoprene, polyurethane, etc. has been found to be superior. A paste adhesive of the epoxy-resin-type is excellent for bonding elastomers to metal.

The contacting surfaces of the covering 10 and the substrate are pretreated to improve their adhesive properties. The covering 10 may be pretreated by such methods as abrasive buffing, or by cleaning and cyclizing. This consists of cleaning the contacting surface by scrubbing it with detergent, rinsing it and allowing it to dry. An acid paste, produced by adding 1,100 grams of barytes to 300 milliliters of concentrated sulfuric acid, is then spread over the cleaned surface and covered with a sheet of polyethylene film. After a period of about 30 minutes for neoprene, or 15 minutes for natural rubber, at about 74°F., the treated surface is washed off and any remaining acid is neutralized with sodium bicarbonate. The covering is then allowed to drain and dry.

The substrate 12 may be degreased with trichloroethylene, toluene, methyl ethyl ketone, or other solvent, and then blasted with grit. In general, the substrate may be of metal, plastic, or concrete material, for example, although in marine use at present the usual substrate which is encountered in practice would be metal.

The substrate 12 is preferably heated to 140°–160°F to provide decrease in viscosity and improve wetting by the adhesive. The adhesive 14 is applied with a spatula to the pretreated surfaces of the covering 10 and substrate 12.

The adhesive-coated surface covering sheet 10 is now applied to the adhesive-coated surface of the substrate 12, lowering it from one side to minimize air entrapment. To eliminate any entrapped air and excessive adhesive, it is advisable to squeegee the covering 10.

It is essential to maintain close contact between the covering sheet 10, the adhesive layer 14, and the substrate 12 while the adhesive cures. This can be done by physically taping down the margin of the covering 10 to the substrate 12, or preferably by a vacuum process.

The vacuum process, which is shown in the FIGURE, comprises placing a strip of sealant 16, for example, high-temperature sealing putty, around and spaced from the edge of the covering 10 and pressing a strip of bleeder material 18, such as felt weatherstripping, for example, into the space between the covering 10 and sealant 16, so that the inner edge of the sealant 16 adheres to the bleeder material 18. A tube 20, which may be made of nylon, for example, is inserted through the sealant 16 into the bleeder material 18 and connected to a vacuum pump (not shown). A film of plastic 22, for example, polyethylene, is placed over the covering 10, bleeder material 18 and sealant 16 and pressed down to seal the edges. The vacuum pump is then operated so that pressure under the film 22 is reduced; this permits atmospheric pressure to maintain close contact between the film 22, covering 10, adhesive layer 14 and substrate 12 while the adhesive is curing at ambient temperature. After about 24 hours, the vacuum is removed and the film 22, sealant 16 and bleeder material 18 are stripped away.

The edges of the covering 10 can then be buffed with an abrasive disk grinder to provide a smooth fairing edge for the covering 10.

Other types of 100 percent reactive adhesives may be used. If a heat-curing epoxy adhesive it utilized, the assembly may be heated with heat lamps and a film 22 of heat-resistant material would be applied.

The covering 10 can also be applied as an inlay on a recessed surface.

Obviously many modifications and variations of the present invention are possible in the light of the above teachings. It is therefore to be understood that within the scope of the appended claims the invention may be practiced otherwise than as specifically described.

I claim:

1. A process for attaching a covering formed of a sheet of cured elastomeric material to a metal substrate comprising the steps of:
   cleaning a surface of said covering to improve its adhesive properties;
   degreasing a surface of said substrate to improve its adhesive properties;
   improving the wetting qualities and decreasing viscosity of the adhesive hereinafter defined by heating said substrate;
   coating said surfaces with an ambient curing epoxy paste adhesive;
   placing said adhesive-coated surfaces in contact with each other; and
   maintaining close contact of said surfaces with each other until said adhesive is cured by applying a sealant around and spaced from the edges of said covering, pressing bleeder material into the space between the sealant and said covering, inserting a tube through said sealant into said bleeder material, placing an airtight covering through which only said tube extends over said covering, bleeder material, and sealant, and evacuating the enclosed space so that atmospheric pressure presses said covering and substrate together.

2. A process as in claim 1 wherein said covering is sheet rubber.

3. A process as in claim 1 wherein said covering is a sheet of neoprene material.

4. A process as in claim 1, wherein said sealant is a high-temperature sealing putty and said bleeder material comprises felt weatherstripping material.

5. A process as in claim 4 wherein said covering is formed from sheet rubber.

* * * * *